3,490,102
METHOD FOR PREPARING CHIGNONS

Silas M. Wheelock, Wilmington, Del., assignor, by mesne assignments, to Reid-Meredith, Inc., a corporation of Utah Continuation of application Ser. No. 401,593, Oct. 5, 1964. This application Dec. 28, 1967, Ser. No. 711,819

Int. Cl. D01b *3/04;* D01g *19/00*

U.S. Cl. 19—66                                        1 Claim

ABSTRACT OF THE DISCLOSURE

The present invention relates to an apparatus for preparing chignon lengths of tow filaments into hackle lengths for subsequent fashioning into chignons in which a table-like support having an elongated opening through the top thereof receives therethrough the upper run of a pair of endless chains having combs spaced therebetween with the comb teeth directed outwardly and upwardly through the opening so as to hackle the filaments, the endless chains being driven by an electric motor. The endless chain drive also drives a pump for pumping an anti-static to a spray nozzle positioned above and at the working end of the endless chains where an operator will be holding the chignon length of tow.

---

The present invention relates to Method and Apparatus for Making Chignons and is a continuation of my similarly entitled application Ser. No. 401,593 filed Oct. 5, 1964 now U.S. Patent No. 3,351,984, and has for an object to provide a simplified high-speed production method for making chignons. Heretofore a length of tow was secured at one end to a wall or support and the length, being two to three feet long, was hand combed to line up the filaments and impart thereto a dressed and coiffeured appearance.

A further object of the present invention is the provision of a machine which will produce chignons at a high rate of consistent quality and under the operation of personnel requiring a minimum of hair-styling training and technique.

A still further object of the present invention is the provision of a machine which will not only form a chignon from a length of tow but will apply an anti-static to render the tow more workable.

The apparatus of the present invention also permits a more natural blending of multiple colored filaments into chignons of intermediate shades such as silver-gray, silver-black, silver-brown, etc.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
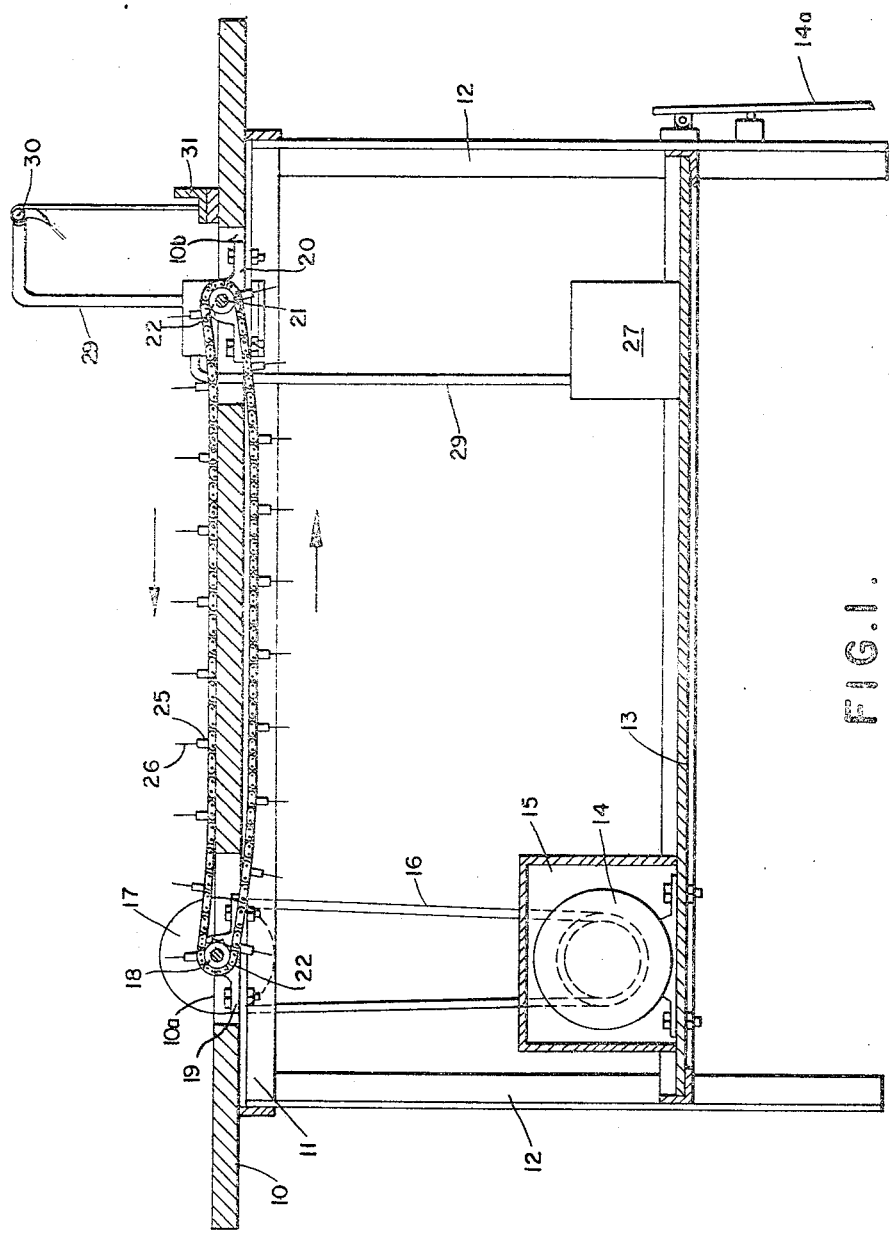
FIGURE 1 is a side elevational view with parts broken away and parts shown in section of an apparatus constructed in accordance with the present invention.

Referring more particularly to the drawings and for the moment to FIGURE 1, 10 designates a table-like support having openings 10ª and 10ᵇ therethrough. This table-like support 10 is supported upon a frame 11 having legs 12. Beneath the bed frame 10 and lying intermediate the legs 12 is a support member 13 upon which is mounted an electric motor 14 confined within a protective housing 15. The motor 14 drives a V-belt 16, which is in driving engagement with a pulley 17. The pulley 17 is keyed to drive shaft 18 which is journaled in bearings 19, carried on the machine frame 11.

In the area of opening 10ᵇ, bearings 20 journal shaft 21. Carried on and secured to rotate with shafts 18 and 21 are sprockets 22, about which are entrained endless chains 23, 24. Secured between the endless chain runs 23 and 24 are comb members 25 having their teeth 26 directed outwardly from the endless chains 23, 24. The comb members are spaced apart at 3 inch intervals.

Figure 2:
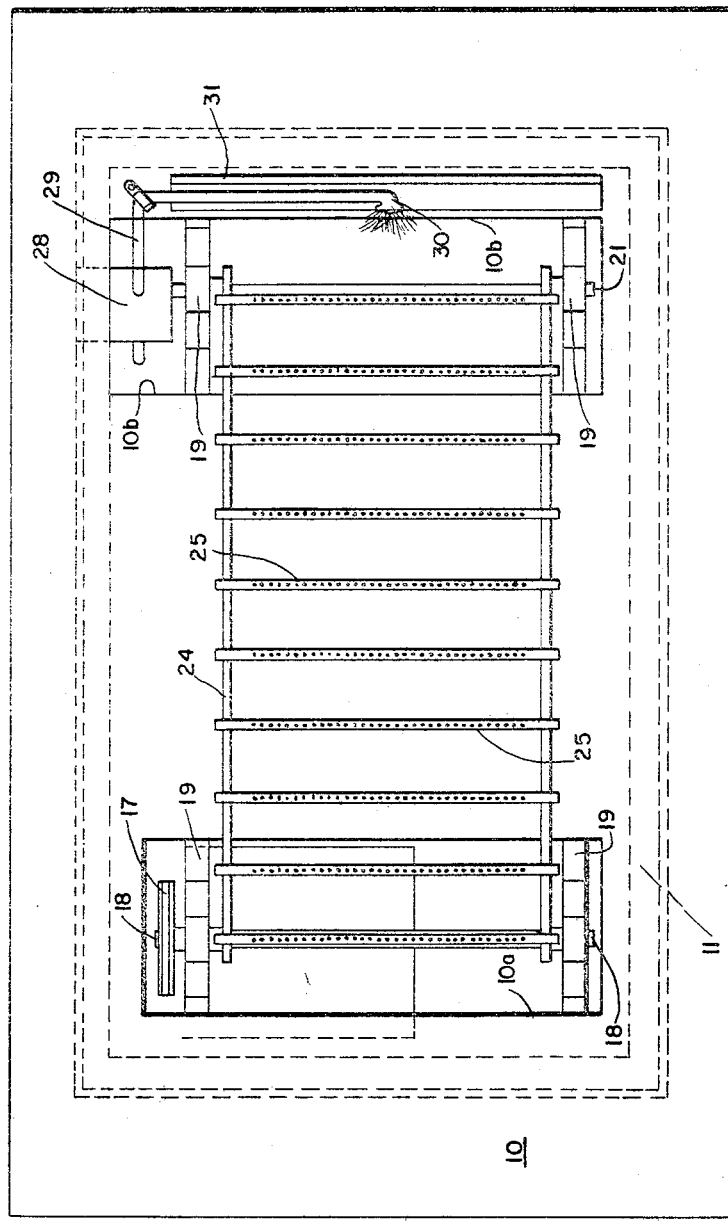
FIGURE 2 is a top plan view of the apparatus of FIGURE 1.

At the end of the machine remote from the motor, is an anti-static liquid tank 27, which supplies anti-static liquid to a gear pump 28 through line 29. The output of the gear pump 28 is directed to the spray line 29ª terminating in a spray nozzle 30, positioned above and substantially centrally over the comb means as best seen in FIGURE 2. The gear pump 28 is connected to and drawn by shaft 21 so that the output of the pump will be proportional to the rotary speed of shaft 21 whereby a uniform coating of anti-static material is deposited upon the tow being acted upon by the comb units 25.

The electric motor 14 is actuated by a foot switch 14ª under the control of the operator. Rearwardly of the opening 10ᵇ in the table-like support is an angle ironwork rest 31, upon which is supported a length of tow being combed into a chignon.

In operation, the machine operator first cuts a 24 to 30 inch length of tow and then feeds the tow across the work rest 31 while simultaneously engaging the foot switch 14ª, which engages motor 14 driving V-belt 16, pulley 17, and rotating shafts 21, 22. This causes the endless chains 23, 24 to travel in the direction of the arrows shown in FIGURE 1. As the tow is combed by the comb units 25, the operator can, by manipulating the chignon in a rolling action, design a smooth, stylable chignon, and, in fact, may blend the filaments into a chignon for matching graying hair from any basic color. By way of example, by blending in silver filaments with brown filaments, the proper blend can be obtained to match the hair of the individual seeking same, once a hair sample of the individual is available.

Although I have disclosed herein the best form of the invention known to me at this time, I reverse the right to all such modifications and changes as may come within the scope of the following claim.

What is claimed is:

1. The method of preparing chignons from tow lengths of synthetic monofils comprising:
   (a) firstly cutting lengths of tow from 24 to 30 inches
   (b) subjecting the thusly cut tow to the rapid combing action of a battery of combs moving in a direction away from the chignon while the chignon is maintained substantially horizontal
   (c) simultaneously applying an anti-static to the tow during the combing action at a rate proportional to the speed of combing and
   (d) imparting a rolling action to the tow during combing to form a smooth, stylable chignon.

References Cited

UNITED STATES PATENTS

| | | | |
|---|---|---|---|
| 453,945 | 6/1891 | Sheehan | 19—126 |
| 1,973,761 | 9/1934 | Hill | 19—66 |
| 2,418,995 | 4/1947 | Thomas et al. | 19—66 XR |

DORSEY NEWTON, Primary Examiner

U.S. Cl. X.R.

19—115